July 1, 1969
N. MOTTA
3,453,525
VOLTAGE AND CURRENT REGULATED POWER SUPPLY
CIRCUIT INCLUDING SELF-PROTECTIVE FEATURES
Original Filed Oct. 16, 1964
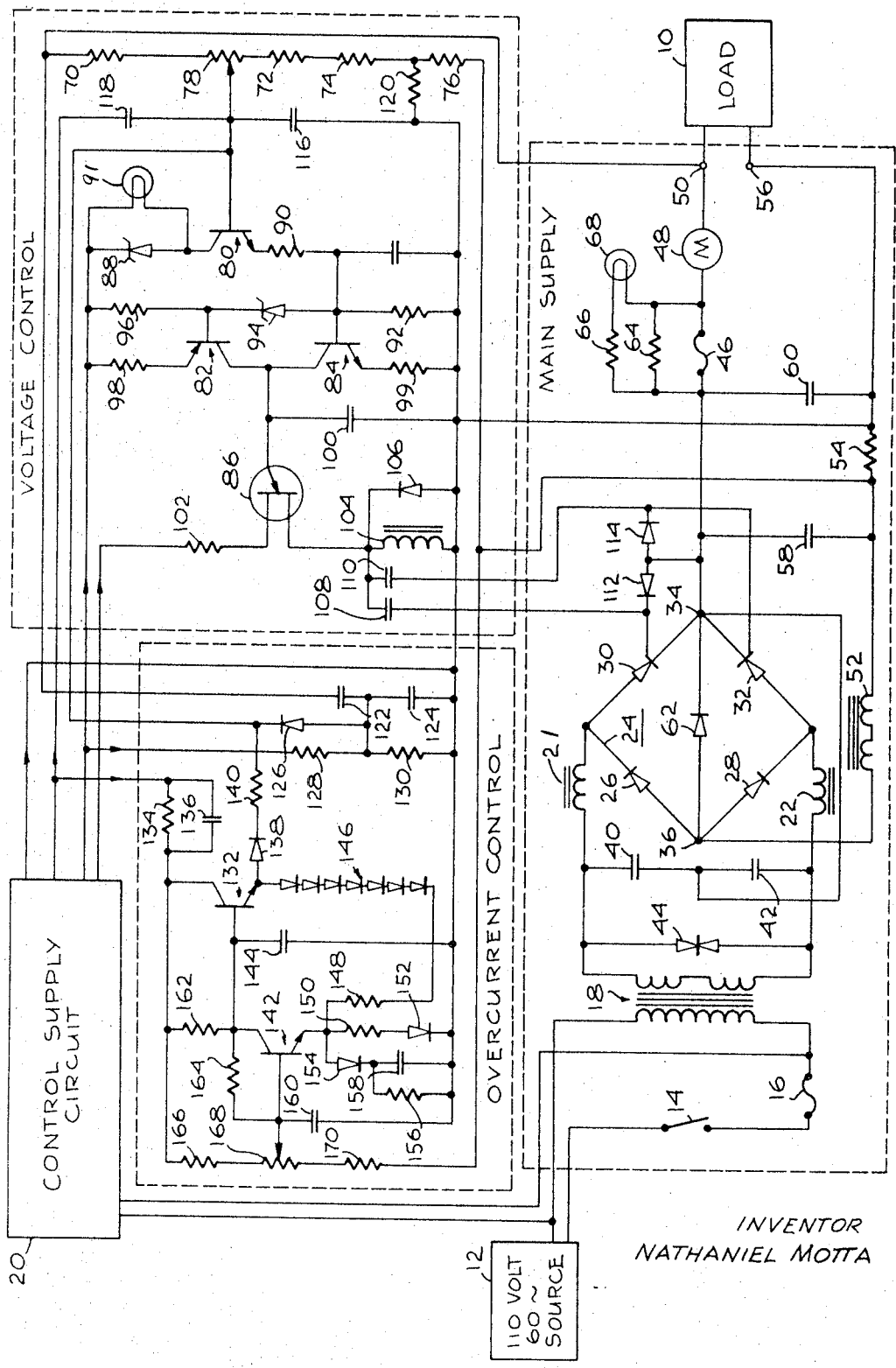
INVENTOR
NATHANIEL MOTTA United States Patent Office 3,453,525
Patented July 1, 1969

3,453,525
VOLTAGE AND CURRENT REGULATED POWER SUPPLY CIRCUIT INCLUDING SELF-PROTECTIVE FEATURES
Nathaniel Motta, Pasadena, Calif., assignor to California Institute Research Foundation, Pasadena, Calif., a corporation of California
Original application Oct. 16, 1964, Ser. No. 404,465, now Patent No. 3,414,774, dated Dec. 3, 1968. Divided and this application Apr. 5, 1968, Ser. No. 719,042
Int. Cl. H02m 1/18, 1/08, 7/00
U.S. Cl. 321—14         2 Claims

ABSTRACT OF THE DISCLOSURE

An arrangement for controlling the amount of current delivered to a load is provided which senses the voltage across the load. If the current supplied to the load rises above a predetermined value, a current control circuit is brought into operation which supplies current until a value is reached which can result in damage to the circuit. It then turns off the flow of current. If the conditions of the load return to a permissible one, provision is made for the automatic restoration of the current.

This application is a divisional of our co-pending application, Ser. No. 404,465, filed Oct. 16, 1964, now Patent No. 3,414,774.

Background of the invention

This invention relates to regulated powder supply circuits and more particularly to improvements therein.

Objects and summary of the invention

An object of this invention is the provision of an improved power supply circuit and more particularly an improved solid state regulated charging circuit.

Another object of the present invention is the provision of a novel arrangement for an improved regulated charging circuit.

Yet another object of the present invention is the provision of a charging circuit which is automatically controlled in the manner required by the load characteristics.

Still another object of the present invention is to provide a novel and useful regulated charging circuit employing silicon controlled rectifiers therein together with unique means for protecting said silicon controlled rectifier against the effects of adverse load characteristics.

These and other objects of the invention are achieved in a charging circuit, which may be employed for charging batteries, for example, wherein the current applied to the load is derived through silicon controlled rectifiers. A circuit arrangement is provided which is controlled in response to the voltage across the output of the charging circuit arrangement for determining the time of the application of control pulses to the silicon controlled rectifiers to maintain the value of current flow which is required. In the event that the current flowing rises above a predetermined value, this is sensed and a current control circuit is brought into operation. The current control circuit substitutes its control in place of the voltage control. The application of pulses to the silicon controlled rectifier is thus under the current control circuit which, when the current demand on the charging circuit approaches a predetermined value which can result in damage to the silicon controlled rectifiers, operates to hold up the further application of pulses to the silicon controlled rectifiers, thereby turning off the flow of current. Provision is made for the automatic restoration of current and then voltage control, if the conditions of the load so permit.

Brief description of the drawing

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a schematic-circuit diagram of an embodiment of the invention.

Description of the preferred embodiment

This invention will be described as a regulated charging circuit of a type suitable for charging a battery. It should be appreciated that this explanation and use of the invention is by way of illustration and is not to be construed as a limitation upon the invention.

Referring to the drawing, a controlled charging circuit for a load 10, in accordance with this invention, derives its power for charging the battery from a 110 volt-60 cycle source of power 12. This source is connected through a switch 14 and fuse 16 to the primary of a transformer 18. Connection is also made from the 110 volt supply 12 to a control supply circuit 20. As will be described in more detail subsequently herein, the control supply circuit provides regulated DC voltages for operating the over current control and DC voltages, plus a full wave rectified voltage which is clipped to the voltage control circuits.

The secondary winding of the transformer 18 has both ends thereof connected through the respective inductors 21, 22 to opposite terminals of a rectifier bridge 24. Two sides of the rectifier bridge are made up of rectifiers 26, 28 and the other two sides of the rectifier bridge are made up of silicon controlled rectifiers 30, 32. One side of the output from the rectifier bridge is taken from the junction 34 between the two silicon controlled rectifiers 30, 32. The other side of the output from the rectifier bridge is taken from the junction 36 between the two diodes 26, 28. Two capacitors respectively 40, 42 are connected in series across the output of the secondary winding of the transformer 18. The junction of these two capacitors is connected to the junction 34. These two capacitors serve as a noise filter. A double anode Zener diode 44, also connected across the secondary winding of the transformer 18, serves to protect the following circuitry. In the event the voltage across the secondary winding exceeds a predetermined level, the Zener diode breaks down holding peak voltages to safe limits. If the product of Zener current and time exceed certain limits, the primary current of transformer 18 will blow fuse 16.

The junction 34 serves as the positive side of the charging circuit and is connected through a fuse 46 and current indicating meter 48 to an output terminal 50. The junction 36, which is the negative side of the rectifier bridge, is connected through an inductance 52 and a current sensing resistance 54 to an output terminal 56. The load 10 is connected to the output terminals 50, 56. Capacitors 58 and 60 are connected in the output circuit of the rectifier bridge, and together with resistor 54 and inductance 52 serve as a filter for the output from the rectifier bridge 24.

There is connected between the junctions 34, 36, a diode 62. This diode serves to maintain current flowing through the inductance 52 during the intervals within which the silicon controlled rectifiers (hereinafter designated as SCR's) are not conducting. It will be seen that this diode is connected so that while the SCR's are conducting, it is reverse biased, and therefore essentially out of the circuit. When SCR conduction ceases, the energy stored in inductance 52 causes a reversal of polarity to occur across its terminals. Since one of its terminals is tied to the negative buss, the other connected to junction 36 becomes positive. This forward biases diode 62 which thus provides a path for current flow to junction 34.

In the event the fuse 46 blows, which might result in the removal of a control voltage (which as will be subsequently shown is required for controlling the conduction of the SCR's), a resistor 64 is placed across the fuse 46. This resistor has its value selected so that the control voltage which is provided when the fuse 46 blows will prevent the control circuit from operating at a level such that damage would occur to capacitors 58 and 60. An indication that the fuse 46 has blown is provided by the series connected resistor 66 and lamp 68, which are connected across the fuse.

As thus far described, the charging circuitry is conventional. In accordance with this invention, there is provided a voltage control circuit and an overcurrent control circuit for regulating the current flow through the load and for protecting the SCR's against the effect of excessive current demand by the load. A series connected resistance string 70, 72, 74, 120, which includes a potentiometer 78, is connected between the output terminals 50 and 56, to thereby permit the output voltage to be sampled by means of the potentiometer 78. The voltage control circuit comprises three transistors respectively 80, 82, 84, which determine both whether or not as well as the time within a cycle at which pulses are applied to the SCR's by a circuit including a unijunction transistor 86.

The moving arm of the potentiometer 78 is connected to the base of the transistor 80. The collector of the transistor 80 connects to the control supply circuit to receive operating potential therefrom, through a shunt connected Zener diode 88 and an overload indicating lamp 91. The emitter of the transistor 80 is connected to the base of transistor 84 through a resistor 90. The base of the transistor 84 is connected to the negative side of the line through a resistor 92. A Zener diode 94 is connected between the bases of transistors 84 and 82. The base of transistor 82 is connected to the positive side of the line through a resistor 96. The emitter of transistor 82 is connected to the operating potential source through a resistor 98.

Unijunction transistor 86 is connected to the collectors of transistors 82 and 84. It is also connected to the negative side of the line through a capacitor 100. The upper base of unijunction transistor 86 is connected to receive operating potential from the control supply circuit 20 through a resistor 102. The lower base of the unijunction transistor is connected to the negative side of the line through an inductance 104 across which is connected a diode 106. The lower or second base of the unijunction transistor 86 is connected through to the control electrodes of the respective SCR's 30, 32, through capacitors 108 and 110, respectively. Diodes 112, 114 are connected between the control electrode and cathode of each SCR, and are for the purpose of preventing the cathode from becoming negative with respect to the control electrode.

The method of controlling the current flowing through the SCR's which is employed herein is known as the "AC phase controlled method." Unijunction transistor 86 applies pulses to the control electrodes of the SCR's which are positive with respect to the SCR cathodes and of sufficient amplitude and duration for reliable firing of the SCR's. The unijunction transistor 86 does not fire and thus produce a pulse until the charge on capacitor 100 reaches a predetermined minimum value. The charging of the capacitor 100 is directly controlled by transistors 82 and 84. The bases of these transistors are tied together by the Zener diode 94 which is connected across a regulated DC voltage provided by the control supply circuit. Resistors 98 and 99 return the emitters of these transistors to the same DC supply. With no voltage applied to the base of transistor 84, the circuit will operate to charge capacitor 100 up to the peak point voltage of the unijunction transistor within 20° of the start of each half cycle of the supply line. As the bases of transistors 82, 84 are made more positive by the control signal received from transistor 80, transistor 82 (PNP) will conduct less heavily and transistor 84 (NPN) will conduct more heavily, thus increasing the time required from the start of each half cycle for the charge on capacitor 100 to reach the firing point of the unijunction transistor 86. This, in turn, reduces the output voltage across the output terminals 50, 56.

It should be noted that since capacitor 100 is being charged through transistor 82, a constant current device, the build-up of the voltage across capacitor 100 is linear. The circuit is thus a combined series and shunt control arrangement regulating the charge appearing on capacitor 100. It also combines the high sensitivity of shunt control with the linearity of series control. Transistor 80 is essentially an emitter-follower, whose emitter-resistor consists of resistors 90 and 92. Thus a portion of the voltage applied to its base from the movable arm of the potentiometer 78 is made available to the bases of transistors 84 and 82. In normal operation, the collector current of transistor 80 is sufficiently small so that the filament of the overload indicating lamp 91 remains relatively cool, and hence its resistance is small compared to the emitter-resistors 90, 92. Under these conditions, the Zener diode 88 is not conducting. Under conditions of high voltage applied to the base of transistor 80, the transistor draws sufficient current to illuminate the lamp filament. This increases the resistance of the lamp filament. Should such current continue to increase, then the Zener diode 88 fires, shunting some of this current and thus preventing burn out of the lamp.

The transistor 80 actually performs two functions. It activates the overload indicator and as an emitter-follower circuit, presents a higher impedance at the movable arm of the potentiometer than would be present were the base of transistor 84 directly connected to the potentiometer. This higher impedance is important, when the required time constant for a filter consisting of a capacitor 116 which is connected between the base of transistor 80 and the negative side of the potential supply, and associated resistors are taken into account. It would initially appear that the time constant of this filter need only be long enough to provide a sufficiently smooth signal to the base of transistor 80. In reality, however, a very much longer time constant is required if unbalanced operation of the SCRs is to be avoided.

To analyze what occurs when the time constant is too short, let it be assumed that an increase in output voltage occurs, due to a line surge, while SCR 30 is conducting. This surge must in some way arrive at the base of transistor 80 if control is to be maintained. However, since, in this type of circuit, there is no control over the SCRs after they are fired, the earliest time at which correction can be made for the over voltage must be during the next half cycle when the SCR 32 is fired. If a sizable correction is made at this time, SCR 32 will produce a substantially lower output which in turn, when arriving at the control circuit, will cause SCR 32 to further increase its output. This regenerative process rapidly builds up to the point where SCR 30 is carrying the full load and SCR 32 is contributing essentially nothing. To avoid this condition, the rate of charge of control voltage appearing at the base of transistor 80 must be slower as the gain of the control amplifier is increased. Accordingly, some recovery time of the control circuit must be traded in order to obtain a proper distribution of load between the SCR's. In a battery charger, recovery time is of secondary importance. Thus, a long time constant filter is used at the input to the control circuit to prevent a condition of the type described above from occurring.

As previously indicated, when no control voltage is applied at the input of the control voltage amplifier, comprising the base of transistor 80, the SCR's are fired close to the start of each cycle. This condition, which would exist when the charger is first turned on, can produce a very large surge in output voltage, aggravated of course by the necessary long time constant mentioned above. To overcome this, a capacitor 118 is connected from the base of transistor 80 to the control supply circuit. This provides a source of potential at the time power switch 14 is closed. Capacitors 116 and 118 operate as a capacitive voltage divider device and the charge which is initially applied to capacitor 116 is sufficiently large to cause conduction by transistor 80. This in turn blocks the operation of the remainder of the voltage control circuit whereby the SCR's are prevented from firing. As the charge across capacitor 116 leaks off through the shunt connected resistance string, including potentiometer 78, resistor 72, resistor 74 and a resistor 120, there is a smooth decay of conduction on the part of transistor 80 with the consequent smooth buildup of the firing of the SCR's and output voltage to the required level.

The long time constant filter which has been previously discussed as being necessary at the input to transistor 80 to prevent the shift of the load current from both to one SCR must be modified somewhat in the presence of a sudden reduction in load, causing a sudden increase in output voltage. This is taken into consideration by the provision of two series connected capacitors, respectively 122, 124, which are connected across the output of the charger and which have their junction point connected through a diode 126 to the base of transistor 80. A capacitive voltage divider is provided by the capacitors 122 and 124, and a sudden increase in the output voltage is properly applied through this capacitive voltage divider and the diode 126 to the base of the transistor 80 to prevent more than a limited response, for a time, to the situation which occurrs when a sudden reduction in load occurs. The values of capacitors 122 and 124 are selected to limit the excursion which occurs when a resistance load drawing maximum current is suddenly removed. The resistive divider, consisting of resistors 128, 130, the junction of which is connected to the diode 126, are connected to have a potential applied thereacross from the control supply circuit such that the voltage at the positive terminal of capacitor 124 is slightly below the bottom of the range of voltages normally encountered at the base of transistor 80. Resistor 130 also provides a discharge path for capacitor 124 to enable the circuit to handle current reductions in load.

Attention is specifically directed to the overcurrent control arrangement including transistors 132 and 142. The circuit described operates as an amplifier over a predetermined voltage range at the top of which it transfers to a monostable flip-flop. Thus, the circuit arrangement while described as a control circuit for a charging circuit, also has independent utility in those instances where characteristics of the type described are required. This could be, for example, monitoring and detection circuitry wherein it is desired to obtain a useful output as long as the input stays within a predetermined range. When that input exceeds said predetermined range, then a warning relay or other apparatus can be actuated. Accordingly, it is to be understood that the description of the circuit arrangement including transistor 142 and 132 in combination with a charging circuit is to be construed as illustraive and not as limiting.

The overcurrent control circuit includes an output transistor 132 which has its collector connected through a resistor 134 and a parallel capacitor 136 to the control supply circuit to receive operating potential. The emitter of transistor 132 is connected to the base of transisor 80 through a series connected diode 138 and resistor 140. The base of transistor 132 is connected to the collector of transistor 142. The base of transistor 132 is also connected to the negative buss through capacitor 144. The emitter of transistor 132 is connected to the emitter of transistor 142 through a series connected diode string 146 in series with a resistor 148. The emitter of transistor 142 is connected to the negative buss through a resistor 150 in series with a diode 152. The emitter of transistor 142 is also connected to the negative buss through a diode 154 which is connected in series with a parallel connected resistor 156 and capacitor 158.

The base of transistor 142 is connected to the negative buss through a capacitor 160. The collector of transistor 142 is connected to the operating potential source through a resistor 162. A feed back resistor 164 is connected between the collector and base of transistor 142. A bias is applied to the base of transistor 142 by means of a voltage divider string including series connected resistor 166, potentiometer 168, and resistor 170. The base of transistor 142 is connected to the movable arm of the potentiometer 168.

It should be noted that the series resistance string from which a bias voltage is derived for transistor 142 has its lowermost end connected to the most negative side of sensing resistor 54. Thus, the potential across this bias voltage divider will vary with the current which is drawn by the load, said current passing through resistor 54. The movable arm of the potentiometer 168 is adjusted so that during normal operation transistor 142 will conduct sufficiently to maintain transistor 132 at cut off. As the load across the output terminals 50, 56 increases, the base of transistor 142 goes more negative whereby transistor 132 is enabled to begin to conduct. Since the emitter of transistor 132 is coupled through the diode 138 and resistor 140 to the base of transistor 80, and the impedance of this circuit is much less than that of the voltage sensing circuit, also connected to the base of the transistor 80, it can override the potential appearing at the base of the transisor 80 from the voltage divider 70, 78, 72, 74, 120. Thus, as the load current increases, the transition from constant voltage to constant current control occurs. The firing angle of the SCR's is proportionately retarded.

An examination of the characteristics of SCR's shows that the permissible load decreases as the firing angle is retarded. Hence, constant current operation by itself, is insufficient to provide good protection. A means must be provided to terminate constant current operation within the safe load operation of the SCR's. Such means is provided by the overcurrent control circuit of the instant invention.

The voltage gain of the transistors 142 and 132 is made sufficient to hold the main supply current within desired limits but yet low enough to permit a change in voltage at the emitter of transistor 132 to activate other circuit functions. With an increase in the load current, the voltage at the emitter of transistor 132 rises in a positive direction. This emitter is coupled through the diode string 146 and resistor 148 to the emitter of transistor 142, which is at the same time becomming less positive. As soon as the difference in potential is large enough to overcome the diode string threshold voltage, conduction through the diode string 146 commences. At this instant, the system becomes regenerative and its action is that of the familiar flip-flop circuit. A positive excursion of the emitter of transistor 142 reduces its collector current which in turn biases transistor 132 to provide an increase in current. The resulting increase in potential at the emitter of transistor 132 coupled to the emitter of transistor 142 completes the feedback path. Since the emitter of transistor 132 is also coupled to the base of transistor 80, and the increase in voltage is large enough, the SCR's are inhibited from firing and the output voltage of the main supply goes to zero. In this manner, the SCR's are protected against damage due to overload.

It was felt that while this mode of operation would completely protect the equipment, it was necessary to avoid the cessation of battery charging which would be caused by transient non-recurrent overloads, e.g., rapid succession of AC power interruption as sometime occurs during thunderstorms. To accomplish this, diode 154, capacitor 158, and resistor 156 were added to the emitter circuit of transistor 142. As a result, when the regenerating cycle starts, the positive voltage excursion which is fed back to the emitter of transistor 142 is attenuated by the current required to raise the charge on capacitor 158 and the resultant voltage drop across resistor 148. This drop on moderate overloads is great enough to inhibit the circuit from obtaining a stable reversal (transistor 142 cut off and transistor 132 conducting). During this interval, the unattenuated positive voltage excursion appearing at the emitter of transistor 132 raises the base of transistor 80 high enough to stop the firing of the SCR's. When this occurs, the cessation of main supply current removes the voltage drop which had existed across resistor 54 and the overcurrent control circuit rapidly recovers to its non-overload state. The positive excursion which has been applied to the base of transistor 132, however, has caused a change in the charge on capacitors 116 and 118, which are connected to the base of transistor 80, and thus resumption of SCR firing is delayed until this charge has leaked off.

If the overload still exists, the cycle is repeated, but since the time constant for capacitor 158 and shunt resistor 156, which are connected to the emitter of transistor 142, is much longer than the time required for SCR firing to be resumed, a substantial portion of the charge which was accumulated during the previous cycle still exists on capacitor 158. The loading effect of this capacitor is thus progressively reduced and after the desired number of cycles, the circuit locks into a stable state of transistor 142 cut off and transistor 132 conducting. As the degree of overload becomes more severe, the on periods of the main supply become shorter and less frequent. In the case of a complete short circuit of the output, a single short duration pulse occurs which in conjunction with resistive current limiting due to the presence of the resistor 54 and inductor 52, protects the rectifiers and SCR's against damage.

As stability is reached in the overload mode of operation, the voltage on the base of transistor 80 rises in a positive direction at a rate determined by the impedance of the circuit charging capacitors 118 and 115. Overload indicator 90 is illuminated by the increased current drawn by transistor 80. Zener diode 88 limits, to a safe value, the voltage appearing across this lamp. Resetting of the overcurrent control circuit is accomplished by turning the main power switch 14 off and then on again.

There has been accordingly described and shown herein a novel amplifier circuit and a circuit arrangement for a solid state power supply employing silicon controlled rectifiers which are controlled in a manner so that they can provide a proper current in response to load demands and they are protected against damage due to load fluctuations.

What is claimed is:

1. A circuit for providing charging current to a load from a source of current wherein silicon controlled rectifier means is interposed in the path between said source and said load which is controlled by the application of pulses to the control electrode of the silicon controlled rectifier, the improvement comprising means for controlling the application of pulses to said silicon controlled rectifier means control electrode responsive to the current flowing to said load through said path including a first and a second transistor, each having collector base and emitter electrodes, means for deriving a first control voltage representative of the current flowing in said path to said load including a first resistor connected in said path, and a connection between the base of said first transistor and one end of said first resistor, means for connecting the collector of said first transistor to the base of said second transistor, a second resistor, a diode means connected in series with said second resistor, means connecting said series connected second resistor and diode means between the emitters of said first and second transistors, a source of operating potential having two output terminals, resistance means connecting the collectors of said first and second transistors to one of the two output terminals of said source of operating potential, a third resistor connecting the collector of said first transistor to its base, a fourth resistor, a diode connected in series with said fourth resistor, means connecting said fourth resistor and diode between the emitter of said first transistor and the second terminal of said source of operating potential, and means for deriving a control signal from the emitter of said second transistor for controlling the application of pulses to the control electrode of said silicon controlled rectifier means responsive thereto.

2. An improved control amplifier comprising a first and second transistor, each having collector base and emitter electrodes, means connecting the collector of said first transistor to the base of said second transistor, diode means, a first resistor, means connecting said diode means and first resistor in series, means connecting said series connected diode means and first resistor between the emitters of said first and second transistors, a second resistor connected between the collector and base of said first transistor, a source of operating potential having a first and second output terminal, resistance means connecting the collectors of said first and second transistors to one of said output terminals, a third resistor, means connecting said third resistor from said first transistor emitter to said second output terminal, means for applying an input signal to the base of said first transistor, and means for deriving an output signal from the emitter of said second transistor, said output signal varying with said input signal until a predetermined level at which said output level remains constant.

References Cited

UNITED STATES PATENTS

| | | | |
|---|---|---|---|
| 2,888,633 | 5/1959 | Carter | 323—9 |
| 3,350,619 | 10/1967 | Jensen | 320—32 |
| 3,355,653 | 11/1967 | Paradissis | 321—19 X |
| 3,365,649 | 1/1968 | Shaw | 321—16 |

JOHN F. COUCH, *Primary Examiner.*

W. H. BEHA, JR., *Assistant Examiner.*

U.S. Cl. X.R.

321—16; 323—9; 330—20